July 20, 1954 A. HORVATH 2,684,002
SPECTACLE FRAME ADJUSTING APPARATUS
Filed Nov. 10, 1950
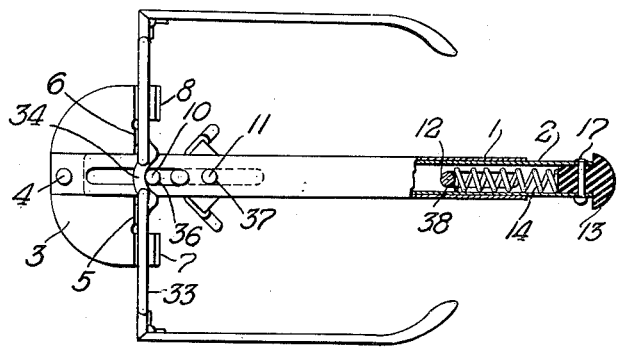
Fig. 2.
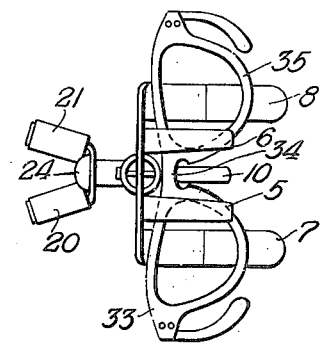
Fig. 3.
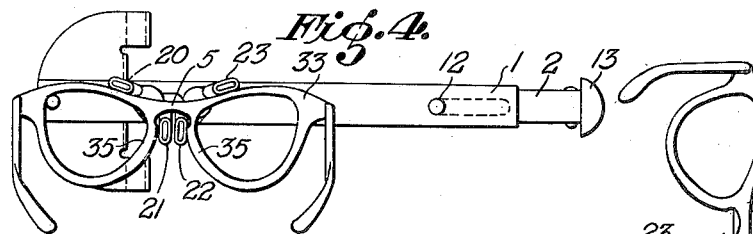
Fig. 4.
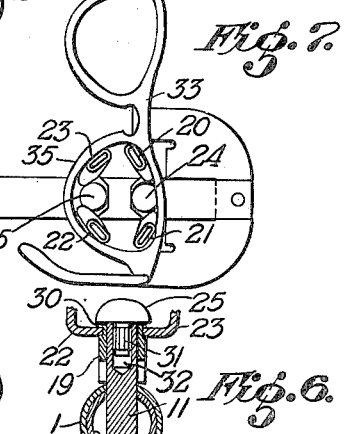
Fig. 7.
Fig. 5.
Fig. 6.
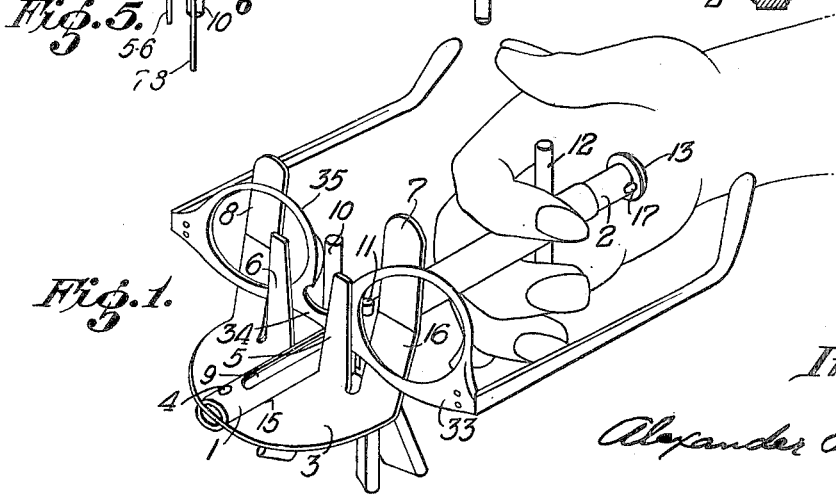
Fig. 1.
Inventor:
Alexander Horvath Patented July 20, 1954

2,684,002

UNITED STATES PATENT OFFICE 2,684,002

SPECTACLE FRAME ADJUSTING APPARATUS

Alexander Horvath, Chicago, Ill.

Application November 10, 1950, Serial No. 195,083

2 Claims. (Cl. 81—3.5)

This invention relates to an apparatus for the purpose of performing spectacle frame adjustments.

One object of this invention is to provide simple and effective means by which plastics or pliable spectacle frames can be altered from their manufactured measurements to conform to the facial features of the wearers.

Another object of my invention is to provide a handy tool or equipment by which a selected plastic spectacle frame can be made usable immediately, thus eliminating the need of carrying a number of sizes and nose measurements, saving time and expense and gaining the satisfaction of the wearer.

Another object of this invention is to provide a multiple purpose tool by which not one but several kinds of adjustments can be made on spectacle frames, such as: broadening the distance between lenses, shortening the distance between lenses, stretching the connecting bridge of the eyerims to higher curves, to eliminate their pressing upon one's nose.

Another object of this invention is to provide a novel spectacle frame adjusting tool, which operates in a straight line sliding manner, to prevent frame distortions.

Other objects of this invention and the various advantages become more apparent as the detailed description herein set forth progresses and are more particularly defined by claims at the conclusion hereof.

In the drawings, which accompany and form a part of this specification or disclosure and in which like numerals of reference denote corresponding parts throughout the several views;

Fig. 1 is a perspective of my device, embodying the invention and showing a plastic spectacle frame positioned for the process of shortening the distance between lenses.

Fig. 2 is a partially sectional view of Fig. 1, viewed from above looking down.

Fig. 3 is a frontal elevational view.

Fig. 4 is the perspective of the arrangement on the opposite half side of the invention.

Fig. 5 is a longitudinal side view of Fig. 4, showing the positioning of a spectacle frame, and showing cross section of construction of the end portion, supporting the pronged plate 3.

Fig. 6 is a traverse section, taken from Fig. 5, on line 6—6.

Fig. 7 is a plan view showing the spectacle frame in position for the purpose of stretching the lens rim.

In Fig. 1, tubular members 1 and 2 are telescopically fitted for sliding motion and are provided with round perforations 37, 38, Fig. 2, which are pierced in a straight line through the diametrically opposite falls of outer tubular member 1, and perforation 36, through walls of inner tubular member 2. Within said round perforations are securely mounted rods 10, 11, and 12. Elongated perforations 9, in the opposite walls of tube 1, and similar elongated perforations 27 and 28, Fig. 5, through the walls of inner tube 2, are correspondingly arranged to permit free sliding movements of tubular members 1 and 2.

Between the push knob 13, held in place by the set pin 17, and the grip-rod 12, there is a coil spring 14, Fig. 2, which returns the tubular members to the initial positions after each operation. When a hand pressure is applied upon the pushknob 13, as shown at Fig. 1, rod 10 moves forward to contact the frame bridge 34, of the previously heat-softened plastic spectacle frame 33, said spectacle frame being held in a position within two sets of upright prongs 5 and 6, and 7 and 8, which are formed to be at right angles to the direction of the sliding operation of the tubular members 1 and 2. Said prongs are parts of the pressed plate 3, which is securely attached within two diametrically opposite slots 15, cut into the end walls of tubular member 1, and held in position by a set pin 4.

It should be noted that prongs 7 and 8 form an angular wedge between themselves and the prongs 5 and 6, part of their way, and become parallel the remainder of the way. Prongs 5—6 and 7—8 are parts of the plate 3, and originate from the same line on plate 3. This arrangement is for the purpose of accommodating the various thicknesses of frames and to provide the spaces between prongs for the frame to be held in a wedged uncurlable position. Prongs 5—6 give support for the frame and the space between said prongs provide the clearance into which the bridge of the spectacle frame is forced by rod 10 during operation for the purpose of increasing the arch of said bridge, or for pulling the two eyerims closer to each other.

As rod 10, Figs. 1, 2 and 3, is being impelled forward by hand pressure, the frame's bridge is being pressed against prongs 5 and 6 of plate 3. As the pressure progresses and the connecting bridge curls around rod 10, and is squeezed into the clearance between prongs 5 and 6, its radius of curvature becomes reduced to approximate that of rod 10, pulling with it the eye rims and lenses within them closer to each other. The more the hand pressure progresses the more the connecting bridge will wrap around the frontal curvature of rod 10, and the more will the eyerims and lenses come closer to one another. This is the purpose of the operation. After the required results of reduction of distance between lenses are reached, the operator holds the pressure for a few seconds, to cool and rigidify the plastic material of the frame, in this newly acquired form.

To obtain a higher arced connecting bridge, the hand pressure is continued until the requirement is reached, then the frame is removed from the device before it becomes fully cooled, and hand aligned for the width of the user's nose.

Rod 10 extends in the opposite direction and protrudes through the walls of tubes 1 and 2. Rod 11 is stationarily secured in the walls of tube 1, and extends parallel to rod 10, in the same direction, terminating at even lengths therewith. Upon these ends of rods 10 and 11, sleeves 18 and 19 are rotatably mounted. Upon said sleeves two sets of diverging prongs, designated by 20—21 and 22—23 are securely mounted. These two sets of prongs and sleeves are held in their positions with the aid of two mushroom shaped buttons 24—25, their stems 31, Fig. 6, tightly pressed or screwed into holes 32, of rods 10 and 11.

Prongs 20—21 and 22—23 are bent at right angles to their bases and formed to proceed divergently toward the terminations of their lengths, giving the appearance of two truncated V's. A spectacle frame requiring a wider distance between lenses, is positioned within said prongs, in such a way that prongs 21—22, Fig. 4, occupy the space of the frame between lenses, and prongs 20—23 contact the eyerims' upper and outer peripheries, Fig. 4, clutching the connecting bridge of the frame at each end of its juncture with the eyerims. As the operation begins and the heel of the hand presses push-knob 13 forward, the prongs 20 and 21 being mounted on rod 10, move forward, while the prongs 22 and 23, being mounted on rod 11 remain stationary. These two sets of prongs with their attached sleeves 18—19 upon the rods 10—11 turn to conform to the contours of the frame, and grip and hold the frame in its true shape, while pulling the heat-softened plastic connecting bridge to the length of the wearer's requirement. Holding the pressure in this position for a few seconds, the plastic material will cool and rigidify, retaining this newly given bridge-length.

The diverging designs of prongs 20—21 and 22—23 are for the purpose of permitting all weights of frames to be lowered to the narrowest spaces of their convergence, in order to pull the softened connecting bridge 34 only, and not the eyerims 35, Fig. 4, of the frame. I provide said diverging prongs as well as the mushroom shaped buttons 24—25 with rubber or plastic coatings to protect the finish of frames and the surfaces of the lenses from becoming marred or damaged when in contact.

All adjustments and frame alterations are performed with this device upon plastic frames immediately after said frames are heat-softened by accepted methods, such as immersion into hot water, hot salt, hot air, hot glass beads, etc.

The term "plastic" includes materials from which spectacle frames are usually made, for example: Celluloids, Lucite, Plexiglas, plastic glass, vinyl, various acetates and acrylic substances and their combinations, etc.

Previous to my invention herein disclosed, dealers, dispensers and professional practitioners in eyeglasses and eyeglass fittings have had the burden of carrying a great number of spectacle frames of various styles, colors, sizes and bridge measurements, involving endless expense and waste in past styles and otherwise obsolete frames, many of them becoming discolored by age, or damaged by repeated handlings. With my invention herein disclosed, any spectacle frame at hand can be made usable immediately. For example, rims too small can be made larger, too wide or too long nose bridges can be made shorter, too short nose bridges can be made longer, shallow nose bridges can be stretched to high arced bridges, all within waiting time of a few minutes, saving expense for the operator and saving otherwise lost working hours for the users. It frequently occurs that after a pair of spectacles have been worn for some time, some discomfort to the wearer develops, for example; the frame may be sliding down on the nose, due to too wide a nose bridge, or the frame may be setting too high on the nose, due to too short a nose bridge. All these discomforts may be corrected, with my herein disclosed invention, without further delay.

Although I have shown and described what I believe to be preferred embodiments of the invention, I realize that many variations in structure are possible. I do not desire to be limited to such described structures, but limit my invention only by the scope of the appended claims.

I claim:

1. Means for adjusting a spectacle frame comprising a stationary member, a relatively slidable member, two pairs of spaced upstanding leg members, fixed at one end of said stationary member, one of said pairs of leg members being disposed in a plane rearwardly of the other of said pairs of leg members, said pairs of spaced leg members being arranged to receive therebetween a spectacle frame, the foremost pair of said leg members providing spaced abutments adapted to engage said spectacle frame at points spaced from the bridge portion thereof, an abutment member carried on the end portion of said slidable member and positioned intermediate the legs of said foremost pair, said abutment member being arranged to engage the bridge portion of a spectacle frame substantially medially thereof so that when it is urged thereagainst by said slidable member said bridge portion will be deformed from its normal condition.

2. Means for adjusting a spectacle frame, comprising an elongated stationary member, a plunger member carried thereon so as to be freely slidable longitudinally thereof, a plate member fixed on the end of said stationary member and having struck therefrom two pairs of spaced upstanding legs with one of said pairs of legs disposed in a plane spaced rearwardly of the other of said pairs of legs, said pairs of legs being arranged to receive therebetween a spectacle frame, the foremost pair of said legs providing spaced abutments arranged to engage said spectacle frame at points spaced from the bridge portion thereof, an abutment pin carried on said plunger member and arranged to engage the bridge portion of a spectacle frame substantially medially thereof so that when urged thereagainst upon pressure being exerted on said plunger member said bridge portion will be deformed from its normal condition.

References Cited in the file of this patent

UNITED STATES PATENTS

| Number | Name | Date |
|---|---|---|
| 845,180 | Krafft | Feb. 26, 1907 |
| 1,327,330 | Kline | Jan. 6, 1920 |
| 1,615,601 | Van Tassel | Jan. 25, 1927 |
| 2,456,532 | Perazzo | Dec. 14, 1948 |